United States Patent
Cowan et al.

(10) Patent No.: US 8,400,492 B2
(45) Date of Patent: Mar. 19, 2013

(54) PROJECTION OF STEREOSCOPIC IMAGES USING LINEARLY POLARIZED LIGHT

(75) Inventors: Matt Cowan, Bloomingdale (CA); Josh Greer, Beverly Hills, CA (US); Lenny Lipton, Los Angeles, CA (US)

(73) Assignee: RealD Inc., Beverly Hills, CA (US)

( * ) Notice: Subject to any disclaimer, the term of this patent is extended or adjusted under 35 U.S.C. 154(b) by 1075 days.

(21) Appl. No.: 11/786,177

(22) Filed: Apr. 11, 2007

(65) Prior Publication Data
US 2007/0188602 A1   Aug. 16, 2007

Related U.S. Application Data

(63) Continuation of application No. 11/441,735, filed on May 25, 2006, now abandoned.

(60) Provisional application No. 60/685,368, filed on May 26, 2005.

(51) Int. Cl.
*H04N 13/00* (2006.01)
*H04N 13/02* (2006.01)
*H04N 13/04* (2006.01)

(52) U.S. Cl. .................. 348/42; 348/43; 348/51

(58) Field of Classification Search ........... 348/51–60
See application file for complete search history.

(56) References Cited

U.S. PATENT DOCUMENTS

| | | | |
|---|---|---|---|
| 4,266,240 A | 5/1981 | Levy | |
| 4,287,528 A | 9/1981 | Levy | |
| 4,517,592 A | 5/1985 | Levy | |
| 4,884,876 A | 12/1989 | Lipton et al. | |
| 4,975,772 A | 12/1990 | Fujita | |
| 5,117,302 A | 5/1992 | Lipton | |
| 5,402,191 A | 3/1995 | Dean | |
| 5,936,663 A | 8/1999 | Tabata | |
| 5,993,004 A * | 11/1999 | Moseley et al. | 353/8 |
| 6,055,012 A * | 4/2000 | Haskell et al. | 348/48 |
| 6,075,555 A | 6/2000 | Street | |
| 6,532,008 B1 * | 3/2003 | Guralnick | 345/419 |
| 6,573,928 B1 | 6/2003 | Jones et al. | |
| 2002/0186348 A1 * | 12/2002 | Covannon et al. | 351/240 |
| 2003/0038925 A1 | 2/2003 | Choi | |
| 2006/0187305 A1 * | 8/2006 | Trivedi et al. | 348/169 |

FOREIGN PATENT DOCUMENTS

| | | |
|---|---|---|
| JP | 08331600 | 12/1996 |
| JP | H.08-331600 | 12/1996 |
| JP | 2000-066136 | 3/2000 |

(Continued)

OTHER PUBLICATIONS

Lipscomb et al., Reducing crosstalk between stereoscopic views, IBM Personal Communication, SPIE vol. 2177, pp. 92-95 (1994).

(Continued)

*Primary Examiner* — David Czekaj
*Assistant Examiner* — Chikaodili E Anyikire
(74) *Attorney, Agent, or Firm* — Baker & McKenzie LLP

(57) ABSTRACT

A method and system for projecting linearly polarized stereoscopic images to a viewer that results in increased viewer head-tipping capabilities is provided. The design includes projecting linearly polarized light energy toward a screen and providing the viewer with a set of linearly polarized eyewear configured to receive the linearly polarized light energy projected to the screen and transmit a right perspective view to a right eye of the viewer and a left perspective view to a left eye of the viewer. Projecting comprises performing a noise reduction technique to reduce crosstalk in linearly polarized light energy images projected.

32 Claims, 16 Drawing Sheets

FOREIGN PATENT DOCUMENTS

| | | |
|---|---|---|
| JP | 2000134644 | 5/2000 |
| JP | 2004-007396 | 1/2001 |
| JP | 2001-054142 | 2/2001 |
| JP | 2001054142 | 2/2001 |
| JP | 2001054143 | 2/2001 |
| JP | 2001-186549 | 7/2001 |
| JP | 2001186549 | 7/2001 |
| JP | 2001298754 | 10/2001 |
| JP | 2002084551 | 3/2002 |
| JP | 2003177465 A | 6/2003 |
| JP | 2004-333561 | 11/2004 |
| JP | 2004333561 | 11/2004 |

OTHER PUBLICATIONS

Janusz et al., "Cancellation of Image Crosstalk in Time-Sequential Displays of Stereoscopic Video," IEEE Transactions on Image Processing, IEEE Service Center, vol. 9, No. 5; ISSN 1057-7149 (May 2000).

Reasons for rejection in co-pending Japanese application 2008-513788 dated Jul. 12, 2011 (Japanese version).

Reasons for rejection from Japanese patent application No. JP2008-0513788 dated Aug. 7, 2012.

* cited by examiner

Left eye image | Right eye image

Original images

Images perceived by viewer due to system induced ghost

Ghost components isolated

Compensated images with ghosts subtracted

Resulting images perceived by viewer

PROJECTION OF STEREOSCOPIC IMAGES USING LINEARLY POLARIZED LIGHT

This application is a continuation of U.S. patent application Ser. No. 11/441,735, entitled "Ghost-Compensation for Improved Stereoscopic Projection," inventors Matt Cowan et al., filed May 25, 2006 now abandoned, which claims the benefit of U.S. Provisional Patent Application Ser. No. 60/685,368, filed May 26, 2005, entitled "Ghost Compensation for Improved Stereoscopic Projection," inventors Matt Cowan et al., both of which are incorporated herein by reference.

BACKGROUND OF THE INVENTION

1. Field of the Invention

The present design relates to the projection of stereoscopic images, and in particular to reducing the effects of image leakage between left eye and right eye views, also referred to as crosstalk or "ghosting."

2. Description of the Related Art

Stereoscopic images are created by supplying the viewer's left and right eyes with separate left and right eye images showing the same scene from respective left and right eye perspectives. This is known as plano-stereoscopic image display. The viewer fuses the left and right eye images and perceives a three dimensional view having a spatial dimension that extends into and out from the plane of the projection screen. Good quality stereoscopic images demand that the left and right eyes are presented independent images uncorrupted by any bleed-through of the other eye's image. In other words, stereoscopic selection or channel isolation must be complete. Stereoscopic selection can be accomplished to perfection using isolated individual optical paths for each eye, as in the case of a Brewster stereoscope. But when using temporal switching (shuttering) or polarization for image selection, the left channel will leak to some extent into the right eye and vice versa. The effect of this leaking is referred to as ghosting or crosstalk.

Various designers have attempted to reduce crosstalk or the ghosting artifact in stereoscopic displays. Most notably, Levy, in U.S. Pat. Nos. 4,266,240, 4,287,528, and 4,517,592, lays out the basic technology for subtracting a portion of one image from the other to reduce the ghosting effect. Levy's implementations were directed to stereoscopic television systems. Ensuing solutions draw heavily on Levy's work and add relatively small improvements.

In the motion picture realm, many degrading artifacts have been cited in the literature as detracting from the enjoyment of the projected plano-stereoscopic motion picture experience, including the breakdown of convergence and accommodation, unequal field illumination, and lack of geometric congruence. None of these artifacts are more important than leakage between left eye and right eye images. Stereoscopic movies show deep, vivid images that create a significant, realistic perception of a spatial dimension that extends into and out from the plane of the projection screen, and this effect is most degraded by crosstalk.

Certain solutions have been proposed to address ghosting, but many of the proposed solutions tend to be uniform across an image or screen surface, i.e. remove the same ghosting artifacts in the same way regardless of screen position, environment, or any other pertinent factor.

The present design seeks to address the issue of ghosting or crosstalk in a projected plano-stereoscopic motion picture environment. It would be advantageous to offer a design that enhances or improves the display of projected plano-stereoscopic motion pictures or images by reducing the crosstalk associated with such motion picture or image displays over designs previously made available.

SUMMARY OF THE INVENTION

According to an aspect of the present design, there is provided a method for projecting linearly polarized stereoscopic images to a viewer that results in increased viewer head-tipping capabilities is provided. The design includes projecting linearly polarized light energy toward a screen and providing the viewer with a set of linearly polarized eyewear configured to receive the linearly polarized light energy projected to the screen and transmit a right perspective view to a right eye of the viewer and a left perspective view to a left eye of the viewer. Projecting comprises performing a noise reduction technique to reduce crosstalk in linearly polarized light energy images projected.

These and other advantages of the present invention will become apparent to those skilled in the art from the following detailed description of the invention and the accompanying drawings.

DETAILED DESCRIPTION OF THE INVENTION

Figure 1A:
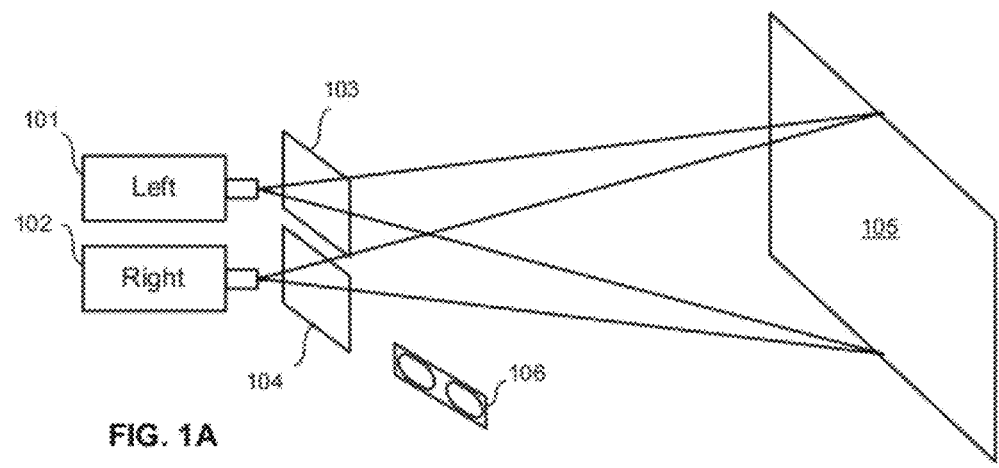
FIG. 1A is a systematic representation of a two-projector system with the projectors independently projecting left and right images, using polarizers to modulate the left and right channels.

Preferred embodiments of the present design focus on large screen projection for entertainment, scientific, and visual modeling applications. Such projection alternates the left and right image on the same screen area using temporal switching or polarization to select the appropriate images for each eye. In the case of temporal switching, which may be combined with polarization modulation, the display alternately transmits left and right eye images, and an electro-optical or similar polarization modulator is employed as part of the selection system to direct the appropriate image to the appropriate eye. The modulator is best located at the projector and used in conjunction with analyzer glasses worn by audience members. An alternate method is to use shuttering eyewear and dispense with the polarization switching approach. Selection devices are synchronized with the frame or field output of the projector to ensure that the frame or field can be perceived by the appropriate eye.

In such projection systems, crosstalk results from a variety of sources, including the imperfect polarization modulation of the displayed image, a timing mismatch between polarization switching and the frame or field output of the display, the imperfect phase of the switch, allowing the wrong eye to leak through at the beginning or end of the frame, imperfect or leaking analyzers for viewing the polarized light, polarization state contamination caused by projection screen depolarization; polarization state contamination caused by airborne dust or dust on the port glass or modulator surface, and, in a linear polarizer selection system, relatively slight rotation of the analyzer glasses.

The present design addresses these sources of crosstalk in projection applications through an empirical calibration process characterizing the crosstalk specific to the projection equipment, image polarization or shuttering equipment, projection screen, viewer image selection equipment, and environment of a given installation. This process yields "ghosting coefficients" that characterize the measured crosstalk and are used to compensate image data at the projection site to provide installation-specific crosstalk cancellation.

Crosstalk is a linear phenomenon that affects each part of the image to the same proportion. Crosstalk may be color dependent in so far as the primary colors that make up the image may have different crosstalk characteristics. In such cases each color may be compensated individually.

The present design may be applied to the class of displays in which the entire image area is addressed or displayed simultaneously. In this case, the predicted ghosting is uniform across the entire screen, and characterization of crosstalk is preferably done by making a single measurement of crosstalk for each primary color to obtain a complete characterization with a single coefficient for each primary color. Alternative embodiments may utilize displays in which the display is written to the screen in lines, segments, or blocks. Where the image is displayed in segments, the ghosting depends on the timing of the display of the segment, related to the switching speed of the modulator or shutter and their temporal characteristics. For segmented displays, characterization may be done for each segment, or for a sample of segments and then interpolated for the other segments.

The present design may also be applied in systems where the level of ghosting is different in different areas across the screen. In this case the system creates a segmented ghosting map where different ghost coefficients are applied in different areas of the screen. This is particularly applicable with polarized projection on silver screens, where the level of ghosting tends to be highly dependent on the projection angle and the viewing angle of the images.

The present design benefits both linear and circular polarization implementations. Linear polarization has higher extinction but greater angular dependency of the polarizer with respect to the analyzer and shows degradation when the viewer tips his head to one side, whereas circular polarization selection has lower extinction but is far more forgiving with regard to head tipping. Using circular polarization for image selection can exhibit low crosstalk comparable to crosstalk obtained when employing linear selection. Using linear polarization for image selection in accordance with the present design can provide an improved head tilting range comparable to that obtained when circular polarization selection is employed.

Figure 1B:
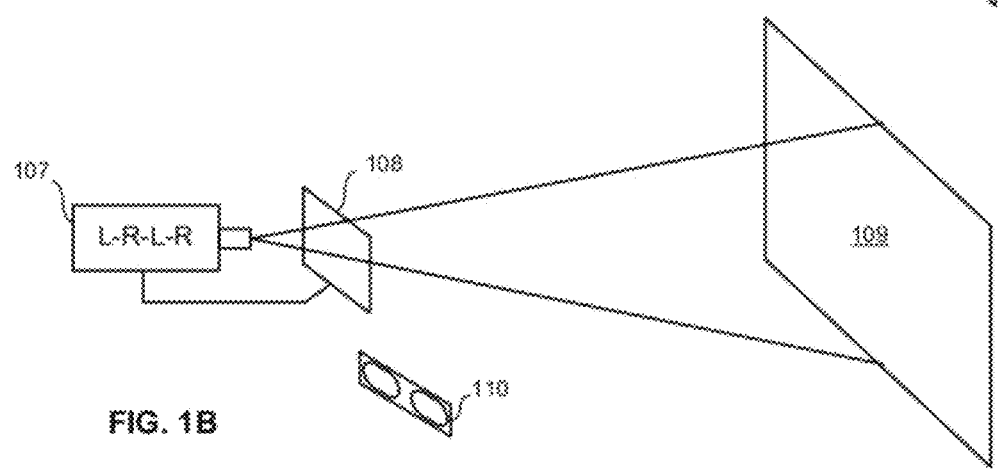
FIG. 1B shows a single projector system employing a polarization modulator in the projected beam to alter the polarization state.
Figure 1C:
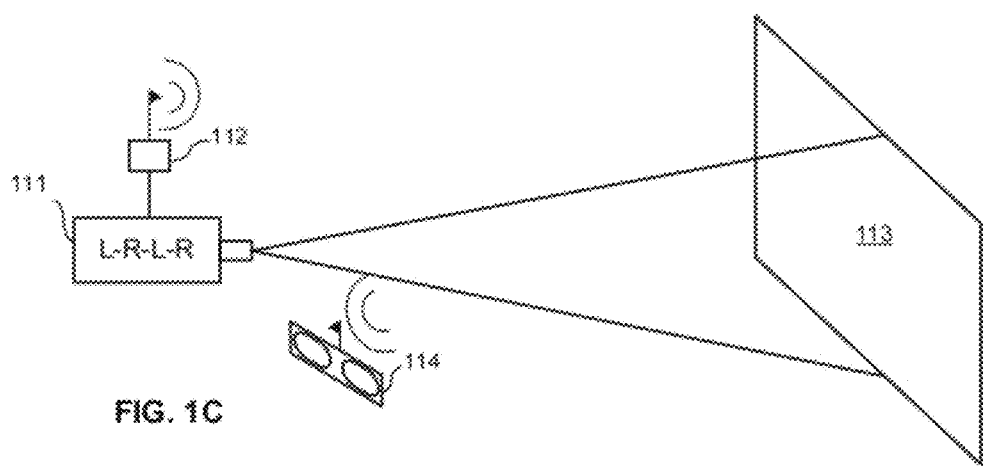
FIG. 1C is a systematic representation of a variation of the single projector system with the left and right frames projected in sequence using active eyewear.

FIGS. 1A, 1B and 1C show drawings of typical systems for stereoscopic projection. Aspects of each system contribute to the crosstalk as described below. FIG. 1A is a two-projector system in which projectors 101, 102 independently project left and right eye images modulated by corresponding linear or circular polarizers 103, 104. One source of ghosting in this system is incomplete conservation of polarization that allows a residual component to leak to the eye whose channel is nominally blocked. Light is reflected from a projection screen 105. Projection screen 105 preferably conserves the polarization of the light projected thereon. In actual practice the screen will to some extent depolarize the incident light, resulting in further ghosting. Glasses 106 that are used to analyze the polarized light are imperfect and also contribute to ghosting.

FIG. 1B shows a single projector system employing a polarization modulator 108, such as a Projector ZScreen® by StereoGraphics®, located in the projected beam. A stereoscopic source drives projector 107 and provides parallel left eye and right eye channels or left and right eye channels in sequence on a single input. However formatted, the end result is frames projected in a sequence of left-right-left-right, and each particular frame may be sequenced to repeat (e.g. L1, R1, L1, R1, L2, R2, L2, R2, L3, etc.). The projected beam passes through modulator 108 which switches polarization states in synchrony with the frame rate of the projector. The system images the projected beam on the viewing screen 109 and the viewer observes the screen through passive polarized analyzer glasses 110.

In this system, a primary cause of ghosting is imperfect polarization of the analyzer glasses 110. Sometimes the depolarization artifact exhibits a color dependency, resulting in more ghosting in one color than another. In addition, imperfect synchronization or phasing of the modulator with respect to the field rate may result in ghosting. In liquid crystal technologies used for modulation, a switching time on the order of hundreds of microseconds may be required for a change in state. If a field or frame is projected during this transitional period, ghosting will be introduced.

FIG. 1C shows a variation of the single projector system. The projector 111 projects left and right frames in sequence to the projection screen 113 as described above. No modulator is used in the optical path at the projector and instead of switching polarization the viewer wears active glasses 114, such as CrystalEyes® by StereoGraphics. The active glasses 114 switch a liquid crystal shutter worn over each eye between a transmissive and a blocking state in synchrony with the projected left and right eye images. Switching is controlled by a wireless sync signal emitter 112 that communicates with the glasses via a communication medium, such as infrared or radio frequency, to switch them in sync with the frame output. In this implementation, ghosting results from factors similar to those previously described, such as the synchronization of the shutters with the field rate and their imperfect dynamic range.

Figure 2A:
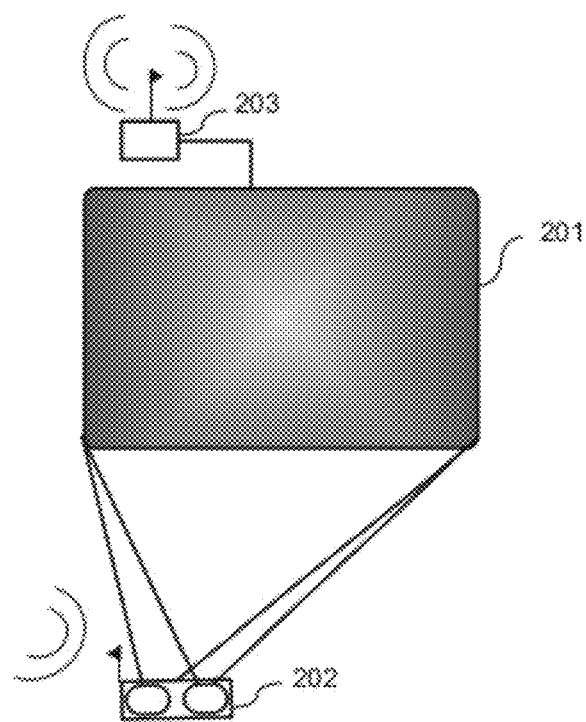
FIG. 2A is a systematic representation of a system using active glasses similar to that shown in FIG. 1C, using a direct view display or monitor.
Figure 2B:
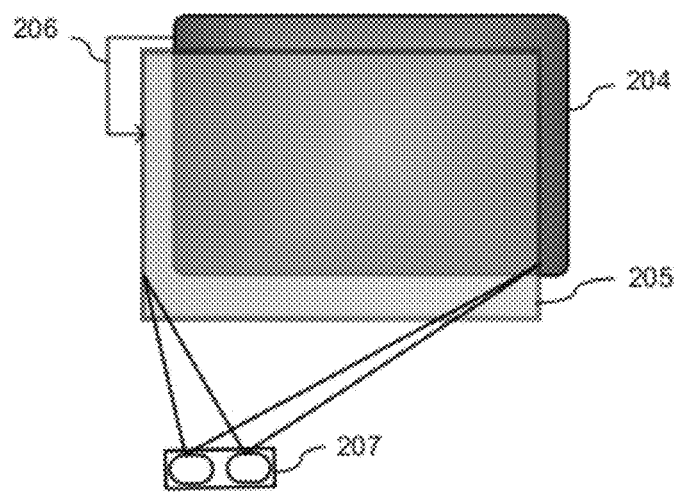
FIG. 2B is a systematic representation of a system using polarization modulation and is similar to that shown in FIG. 1B.

FIG. 2A shows another system somewhat similar to that of FIG. 1C, using a direct view display 201 instead of a projected display. The viewing screen alternately displays left and right eye views, and the system synchronizes active shuttering glasses 202 by a wireless or wired communication link 203 with the frame rate of the display. FIG. 2B illustrates a system similar to that of FIG. 1B using a polarization modulator, such as the Monitor ZScreen® by StereoGraphics, covering the display. The display 204 is viewed through the modulator 205 synchronized with the frame rate of the display 206. Passive polarized glasses 207 are used to select the appropriate image for each eye.

Figure 3A:
FIGS. 3A-3E demonstrate the effect of ghosting and a process for its compensation.
Figure 3A:
Figure 3B:
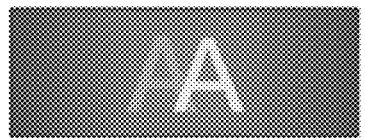
Figure 3B:
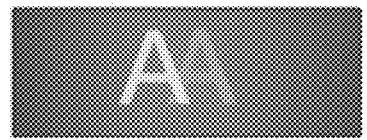
Figure 3C:
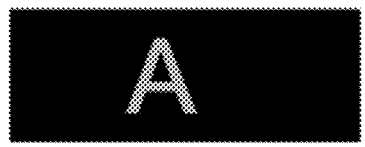
Figure 3C:
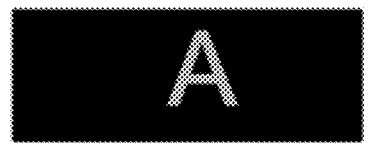
Figure 3D:
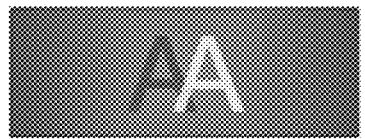
Figure 3D:
Figure 3E:
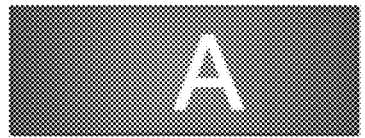
Figure 3E:
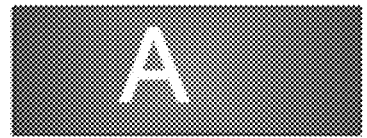

FIGS. 3A-3E illustrate the effect of ghosting and the basic principle of its correaction. FIG. 3A shows original uncompensated left eye and right eye images that form an image pair for creating a stereoscopic perception. FIG. 3B shows the images actually perceived by the viewer's eyes when crosstalk creates ghost images during viewing of the image pair using one of the systems as described above, or the uncompensated views received by the viewer's eyes. FIG. 3C shows the isolated ghost components, where the isolated components are to be subtracted from each eye's image from FIG. 3B. In other words, the right eye image of FIG. 3B shows a left side image and a right side image, and the left side image is the image desired to be retained/transmitted. FIG. 3C shows the isolation, in the right eye image, of the ghosted image, here the right side image, that is to be subtracted from the right eye total image of FIG. 3B. FIG. 3D shows compensated images, where the ghost image perceived at each eye is subtracted from the original image to be provided to the opposite eye. FIG. 3E shows the left eye image and right eye image actually perceived when the compensated images of FIG. 3D are projected and viewed through the same system that originally caused perception of the images of FIG. 3B through the display of the images of FIG. 3A.

The systems identified in FIGS. 1A, 1B, 1C, 2A and 2B introduce different degrees of ghosting, depending on the quality and implementation of the components used in the system. The amount of ghosting produced by a given installation of a given system is preferably measured empirically to characterize the unique ghosting characteristics of that system. As described above, measurements are preferably made for each primary color (i.e. each individual subpixel color) of the projection system. In a conventional display system, this involves characterizing each of the three color channels (red, green, blue) that combine to form the color image. In systems with more (or fewer) primary colors, analogous processes apply. Because the factors that produce ghosting are linear effects, single point per color characterizations may be made to predict the ghosting of the image as a whole.

The basic process for characterizing the ghosting or crosstalk in a given system is to use test patterns that provide a full luminance (white or a primary color) image for one eye and a zero luminance (black) image for the other eye. These images are displayed or projected by the system in L-R-L-R sequence. While a test pattern is displayed, the amount of light passing through the left and right eye portions of a pair of analyzer glasses located in a normal use position can be measured. The amount of light arriving at each eye location in response to the test patterns empirically characterizes the effects of all sources of crosstalk in the optical path between the projector and the viewer's eyes.

Figure 4A:
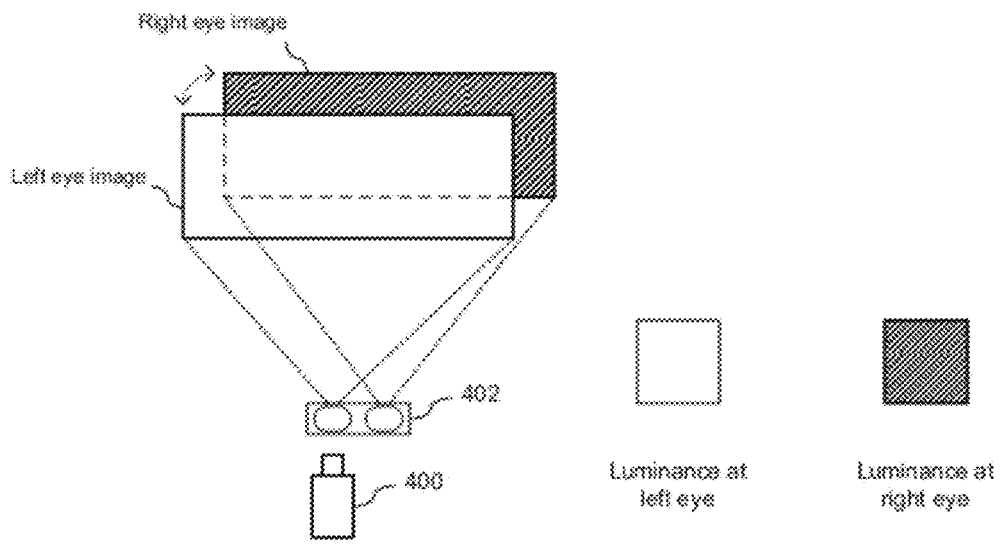
FIG. 4 shows the use of a test pattern to characterize the ghosting at a given installation.
Figure 4B:
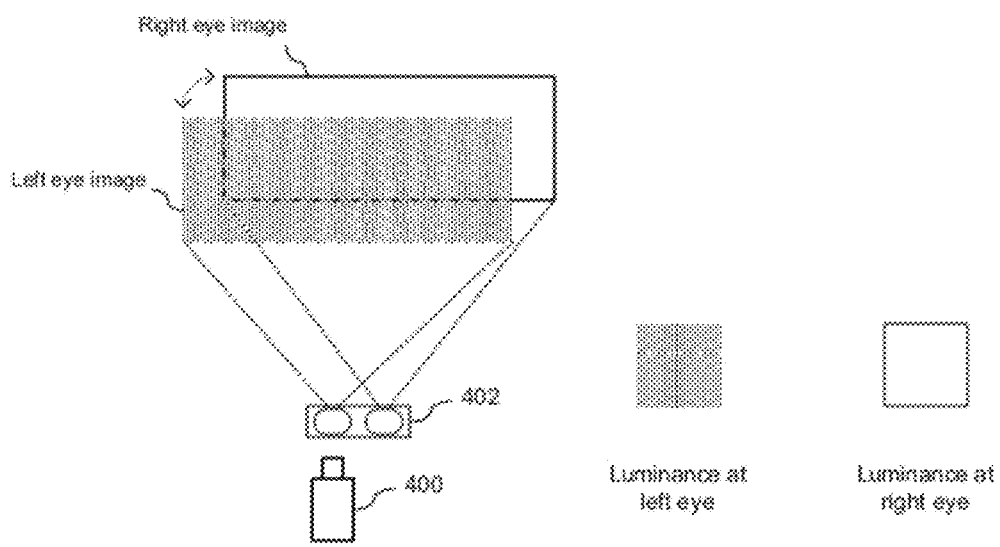

FIGS. 4A and 4B illustrate a process for characterizing ghosting using test patterns as described above. FIG. 4A shows the use of a test pattern that provides full luminance to the left eye and zero luminance to the right eye. A luminance meter 400 may be placed behind a pair of analyzer glasses 402 to measure the luminance at each respective eye position. The luminance meter 400 may be a hand-held device that has a photosensing element for receiving light input and measuring circuitry for measuring and displaying or outputting data characterizing the luminance received by the photosensing element. Examples include the Photo Research PR650 and the Minolta CL-100. Since the left and right eye images of the test pattern are displayed in an alternating fashion, the luminance meter value represents an average over time of the luminance received over many projection cycles.

Using the test pattern of FIG. 4A, in an ideal system the left eye will receive full luminance and the right eye will receive zero luminance. In reality, the right eye will receive some light from the full luminance left eye image as a result of the various crosstalk factors discussed above. Consequently the luminance at the right eye image will typically be a non-zero value. This is referred to herein as the leakage luminance. The luminance measured at the left eye provides a baseline full luminance measurement to be used as described below.

FIG. 4B shows the use of a test pattern that provides zero luminance to the left eye and full luminance to the right eye. Using the luminance meter, measurements are made again at both the left eye and right eye positions. In response to this test pattern, a non-zero leakage luminance is typically measured at the left eye, while a baseline full luminance value is measured at the right eye.

As mentioned above, ghosting may be color dependent. In such cases, the full luminance images are primary color images, and measurements as described above are made for each separate primary color, a feature available in various photosensing devices.

While these illustrations assume that the analyzer glasses used for the measurements are oriented in a horizontally non-tilted alignment with respect to the projection screen, in alternative embodiments it may be desirable to characterize the ghosting effects with the glasses positioned at a slight horizontal tilt. Such testing can yield a ghosting characterization that is slightly increased compared to that of the non-tilted position, however the slight overcompensation that may result may produce a demonstrably better acceptable head tilt range as discussed below with respect to FIGS. 15A and 15B. Such tilting and measurements can enhance the viewing for persons viewing the motion picture or images at a slightly tilted angle from the horizontal.

The foregoing assumes that a calibration procedure occurs within a specific environment. Alternately, the system may calibrate using a model of a specific theater or other computer simulation, or may simply make assumptions about the proposed environment and create GCs based on expected viewing conditions.

Once all measurements are made, a ghosting coefficient (GC) for each eye channel may be calculated by dividing the leakage luminance by the full luminance. The ghosting coefficients GC provide a characterization of the crosstalk from one eye to the other that is created by the particular equipment used in the particular installation where the measurements were made. Where ghosting is color dependent, a separate ghosting coefficient is calculated for each primary color.

As an example, leakage luminance may be computed in each of the red, blue, and green color realms as 10, 15, and 5, respectively, with total or full luminance values of 100, 100, 100. The GC for red (GCR) would be 0.10, or 10 percent, representing 10 leakage luminance divided by 100 full luminance values. Blue and green ghosting coefficients in this example would be a GCB of 0.15 and a GCG of 0.05.

The ghosting coefficients are used to compensate images in a manner that reduces the inherent crosstalk of the display system through cancellation, such that the final images perceived by the eyes exhibit reduced or imperceptible ghosting. More specifically, the ghosting coefficients are used to calculate ghosting components of the type illustrated in FIG. 3C, which are then subtracted from original images to yield compensated images as illustrated in FIG. 3D. When displayed, these images are perceived in the manner illustrated in FIG. 3E.

The design produces each compensated image using an original image and a ghosting component derived from the corresponding opposite eye image of the image pair as follows:

$$R_f = R_i - L_f * GC \quad (1)$$

$$L_f = L_i - R_f * GC \quad (2)$$

where:
$R_f$ is the final compensated image for the right eye;
$R_i$ is the original image for the right eye;
$L_f$ is the final compensated image for the left eye;
$L_i$ is the original image for the left eye; and
GC is the ghosting coefficient.

Through substitution, these equations may be used to characterize the ghost-compensated images in terms of the original images as follows:

$$R_f = (R_i - L_i * GC)/(1 - GC^2) \quad (3)$$

$$L_f = (L_i - R_i * GC)/(1 - GC^2) \quad (4)$$

In the case where the ghosting coefficient is small, the $GC^2$ term becomes small, and the equations may be approximated as:

$$R_f = R_i - L_i * GC \quad (5)$$

$$L_f = L_i - R_i * GC \quad (6)$$

In systems that exhibit color-dependent ghosting, the system calculates compensated sub-images for each primary color using the ghosting coefficient corresponding to each color.

As demonstrated below with respect to FIGS. 15A and 15B, a ghosting coefficient may be employed that is slightly larger than the coefficient measured using analyzer glasses that are aligned in a non-tilted position, as a certain amount of overcompensation can increase the acceptable head tilt range without creating perceptible negative ghosting.

Figure 5:
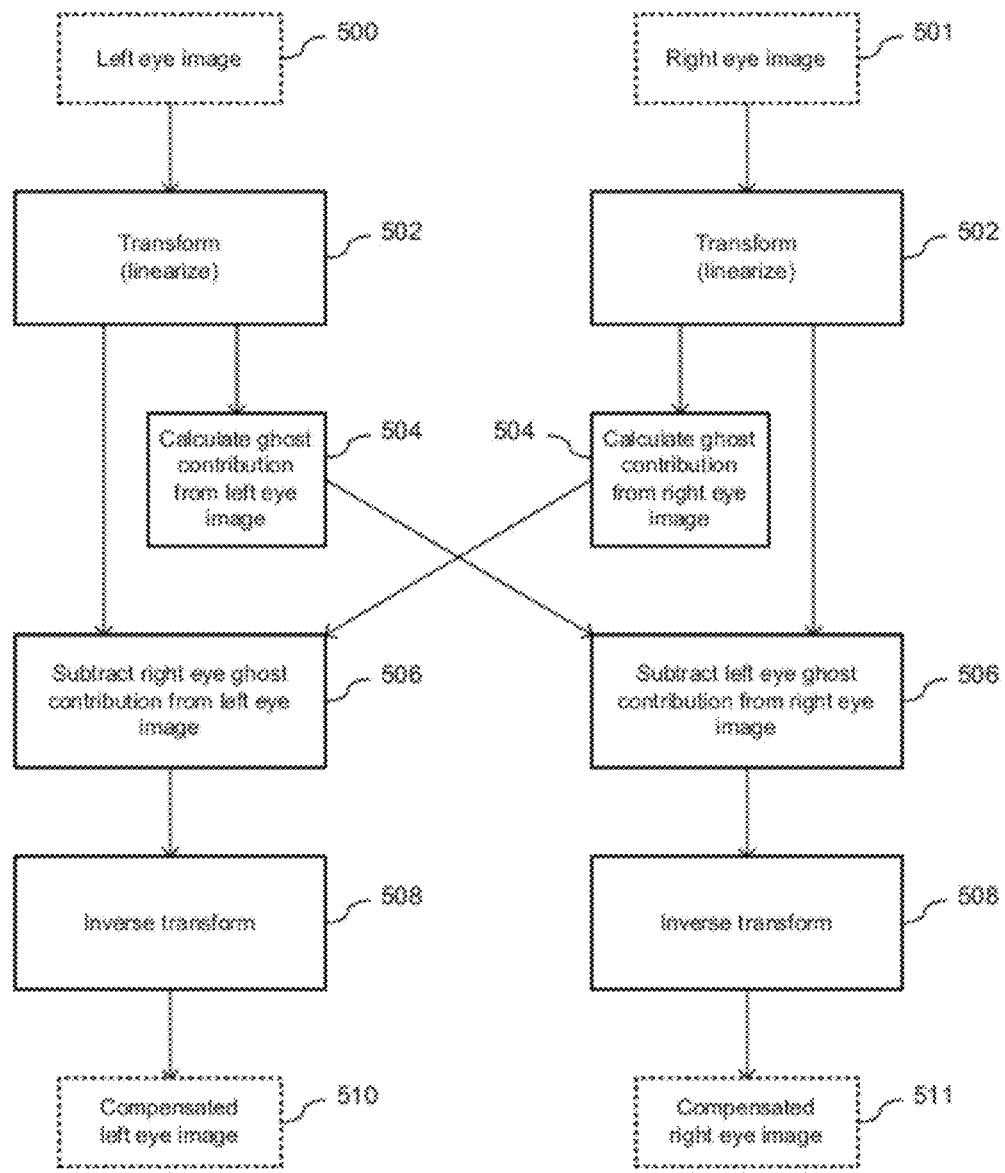
FIG. 5 shows a process for producing left and right eye images that are compensated to reduce ghosting.

Ghosting compensation is preferably implemented in digital display systems in which images are represented as digital data that can be mathematically operated upon to perform image processing in accordance with the ghosting correaction equations provided above. FIG. 5 shows a process flow for producing right and left eye images that are compensated for the ghosting effects of a given system. The process receives left eye image data 500 and right eye image data 501 as inputs. Most digital image representations are non-linear, using either a power law (gamma) representation or a log representation, whereas the ghosting factors operate in the linear realm. Therefore, at point 502, the process initially transforms the left and right eye image data by applying a linear transformation. In general, the linear transformation is preceded by an offset and normalization of the pixel values. For example, in the case of video coded signals, a black level offset (usually 64 in 10 bit representation) may be subtracted from the image received, followed by application of an exponential value (usually between 2.2 and 2.6) to the resultant image, and then multiplication by a scaling factor to fill the usable range (bitdepth) of the processor performing the calculations.

After linear transformation, the system computes the ghost contribution from each eye image at point 504 using the formulas and coefficients discussed above. The ghost contribution calculated for each images is then subtracted at point 506 from the original opposite eye image to yield compensated linear image data. The compensated linear images may be converted back into a non-linear form by applying the inverse of the linear transformation applied above at point 508. Application of the inverse to convert back to non-linear form involves setting the range of representation and applying the non-linear transformation and offset. The output of this processing is compensated right and left eye images 510 and 511.

In implementations where the ghost compensation is integrated into a display device such as a projector, the display device may not be required to put the image representation back into a non-linear representation since the linear image data may be fed directly to the image display elements of the display device. In other words, blocks 508 may not be needed and the output of blocks 506 may be applied directly to the image display elements of the display device and may be displayed.

Figure 6:
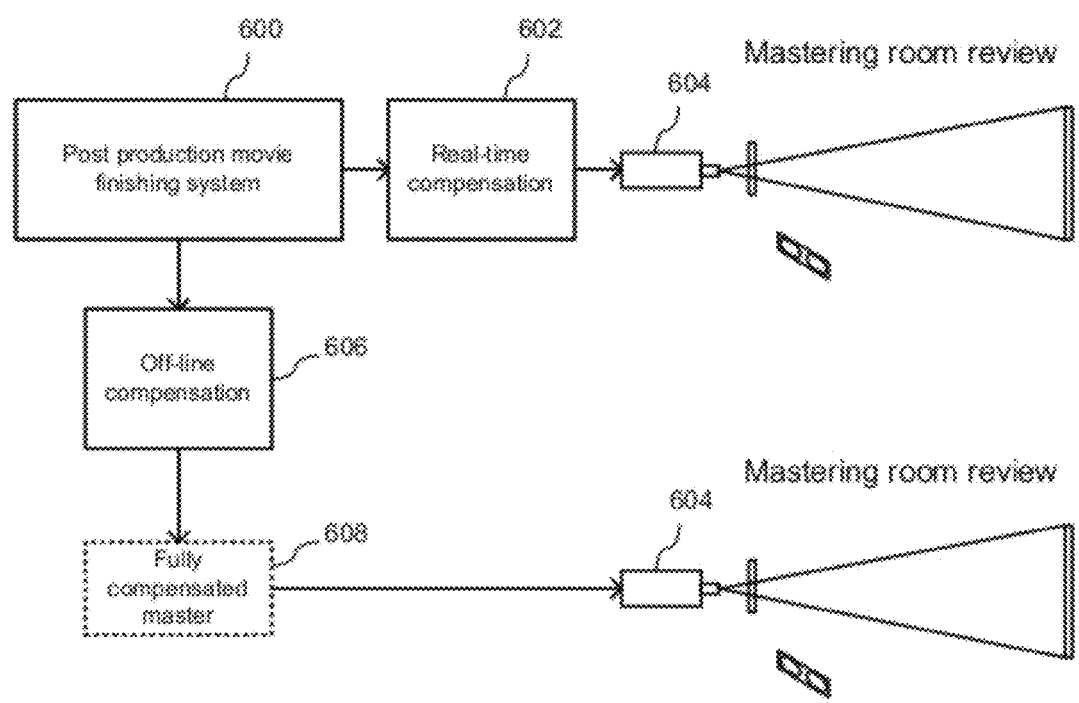
FIG. 6 shows embodiments for postproduction and mastering applications where compensation may occur in real-time or as an off-line render.

In general, ghost compensation may be performed in both real-time and non-real-time implementations. Examples of each are provided in FIG. 6, which shows a postproduction environment where stereoscopic content is finished for viewing at other locations (e.g. cinemas). One approach illustrated in FIG. 6 takes the original, uncompensated two-view or plano-stereoscopic images from a postproduction finishing system 600 and performs real-time ghost compensation 602 between the postproduction finishing system 600 and the reviewing projector 604. This provides the ability to review the results of ghost compensation in real-time, and allows the reviewer to experiment with various levels of compensation.

A second approach for mastering is to use a non real-time process to render the ghost compensation into the images. This system provides an off-line processor 606 that saves a ghost compensated master 608 which may be supplied later for viewing. The ghost compensated master may be used for internal review or may be used as a master for producing distribution copies of the content. In the latter case, the ghosting coefficients used in the compensation processing are typically selected to be an average of the estimated ghosting coefficients present in various viewing installations, as opposed to a value optimized for a specific installation. The real-time and off-line compensation may be implemented either in software, firmware or hardware.

Various real-time embodiments for use in viewing installations such as cinemas are now discussed with respect to FIGS. 7-13. In such installations, image data is typically supplied by a server or player to a digital projector that uses a spatial light modulator (SLM) such as a digital micromirror device (DMD) to render a projected image from the image data. Embodiments discussed below implement real-time compensation in the image data server or in the digital projector, either by taking advantage of the computational capabilities inherent in these devices or by augmenting those capabilities through the incorporation of additional hardware and associated programming. Alternatively real-time compensation may be provided by a stand-alone device that performs compensation on image data streamed from the image date server to the digital projector. Each of these embodiments enables the measurement and use of ghosting coefficients that are installation specific to allow compensation to be optimized for the viewing location.

Figure 7:
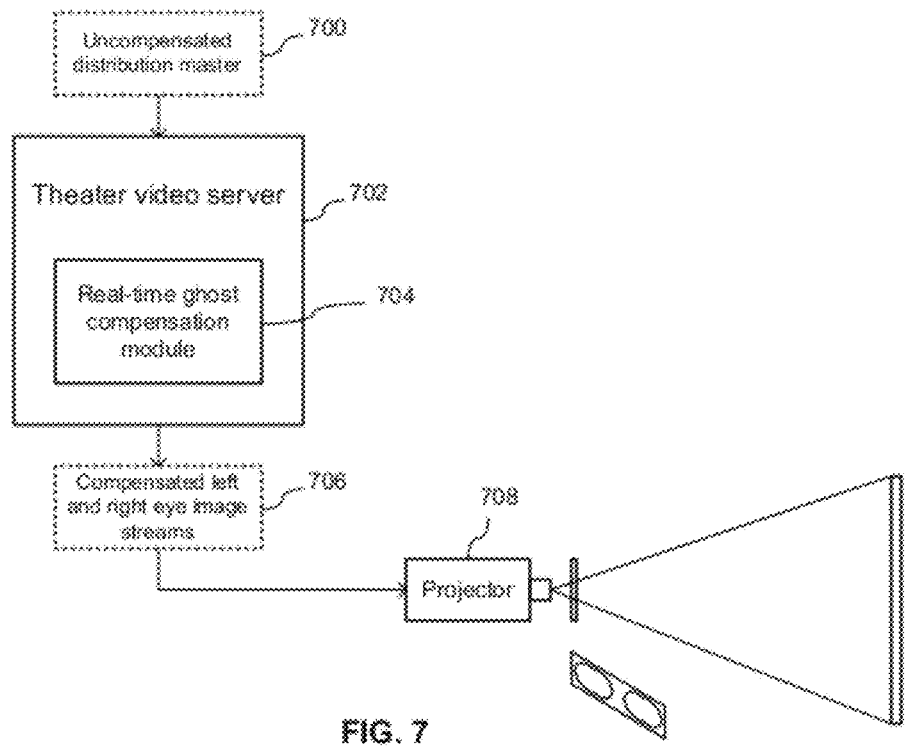
FIG. 7 shows real-time ghost compensation provided in a theater video server.

FIG. 7 illustrates an embodiment in which an uncompensated distribution copy of a stereoscopic movie 700 is played through a theater video server 702 that includes a real-time ghost compensation module 704. The ghosting coefficient(s) applied by the compensation module are measured and calculated for the specific installation to provide optimum performance as generally described above. The system sends the compensated image stream 706 to the projector 708 for display on the projection screen.

Figure 8:
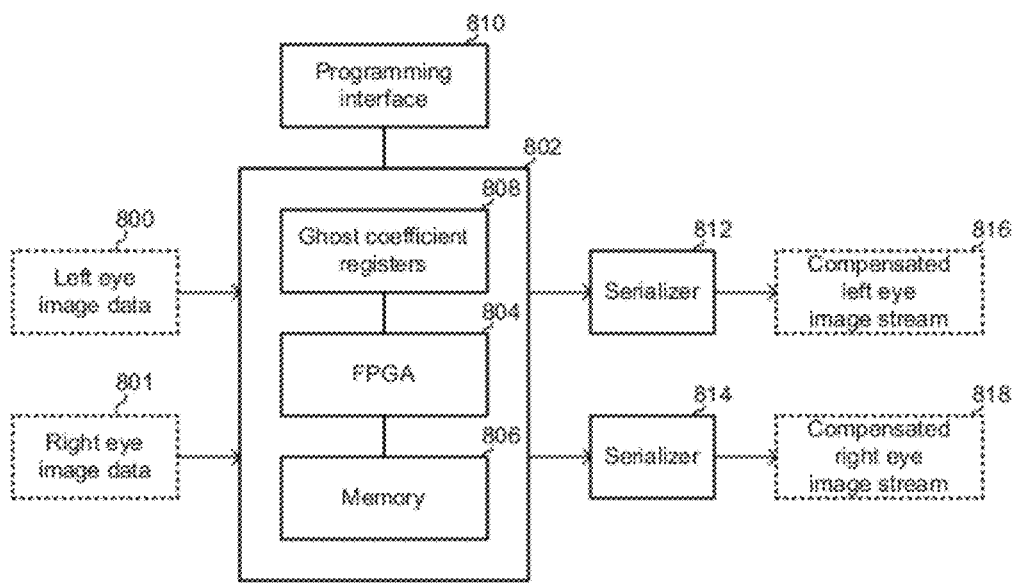
FIG. 8 shows details of the embodiment of FIG. 7.

FIG. 8 shows details of an implementation of the compensation module in a theater video server architecture. The uncompensated image data is obtained by the module 802 from the server memory bus as parallel left eye and right eye image data streams 800, 801. Serializers 812, 814 of the server receive left and right eye output data from the compensation module 802 and convert the output data to serial compensated left eye and right eye image streams 816, 818 that may be supplied to a projector.

Although the image processing of the compensation module may be performed by a microprocessor acting under the control of software or firmware, such as the native processing elements of the server itself, image processing may alternately be performed by a field programmable gate array (FPGA) 804 configured to receive image data and ghosting coefficients as inputs and to process the image data in the manner discussed with respect to FIG. 5. Associated with the FPGA 804 is a memory 806 for providing a working memory space, and ghosting coefficient registers 808 for storing the ghosting coefficients to be applied in the compensation processing. A programming interface 810 enables control of the compensation module 802. In a simple implementation, the programming interface may include a set of switches manually set to provide a binary representation of the ghosting coefficients to be applied. The FPGA 804 may be set in a bypass mode in which no compensation processing is performed. However, in more robust implementations, the programming interface may comprise a serial port or a network interface and related circuitry for receiving ghosting coefficients as well as receiving and executing compensation module control commands.

The primary functionality provided by the hardware is the subtraction of ghosting properties from the left eye and right eye images according to Equations (1) through (6). Compensation for ghosting thus requires calculation of the appropriate coefficients, applying the coefficients to the existing data, and subtracting the ghosted inverse from the image to produce the de-ghosted image. To perform this, particularly when three components such as red, green, and blue are employed and ghost removal occurs for each component of every pixel. Thus the design shifts a great deal of data in and out in a very short amount of time, and primary processing is loading data, performing a subtraction, and transferring the compensated data from the processor or processing device.

Figure 9:
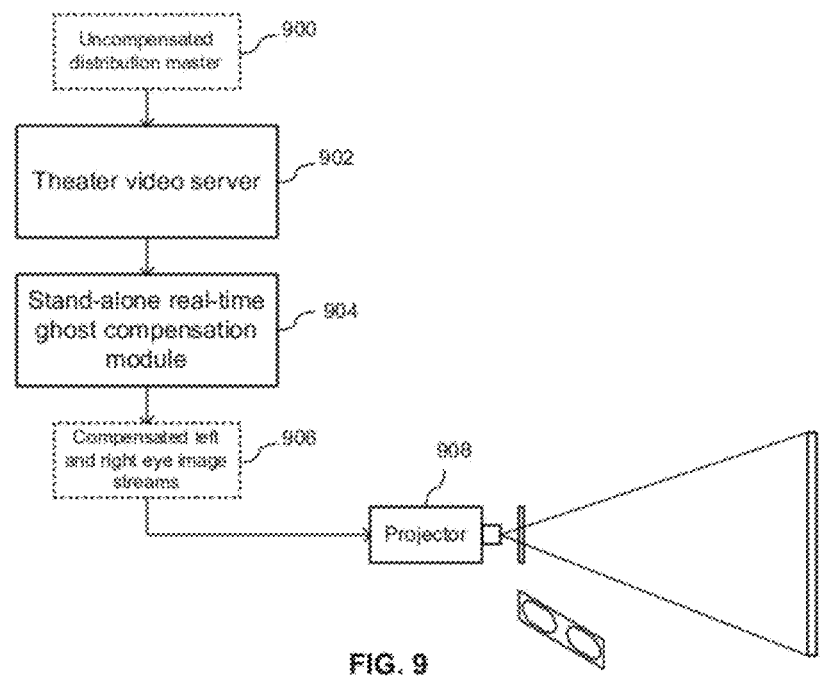
FIG. 9 shows real-time ghost compensation performed by a stand-alone unit between the theater video server and the projector.

FIG. 9 illustrates an alternative embodiment in which an uncompensated distribution copy of a stereoscopic movie 900 is supplied from a theater video server 902 to a stand-alone real-time ghost compensation module 904. The system initially performs the calibration function, i.e measures and calculates ghosting coefficient(s) applied by the compensation module for the specific installation to provide optimum performance. The system sends the compensated image stream 906 to the projector 908 for display on the projection screen.

Figure 10:
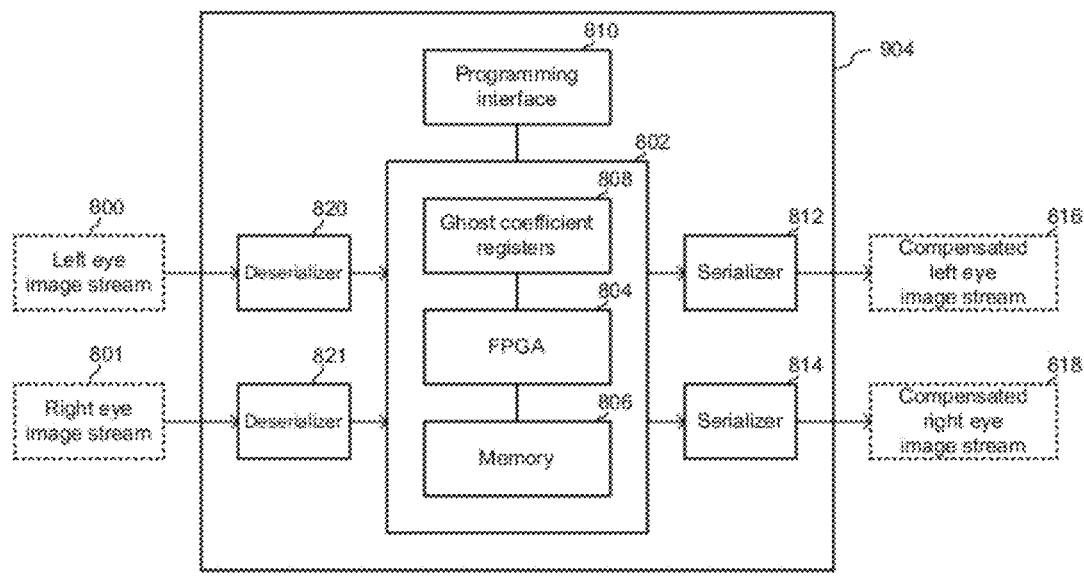
FIG. 10 shows details of the embodiment of FIG. 9.

FIG. 10 shows details of an implementation of the stand-alone compensation module. This module is similar to the module of FIG. 8, but also includes deserializers 820 and 821 that convert the input left eye and right eye image streams 800 and 801 in serial form into parallel form for processing by the compensation module 802. Data in a theater video server environment, as well as other vide environments, may be received in serial form and processing of serial data according to the methodology described cannot occur. Thus data is converted from serial to parallel for full ghost compensation processing. All of the elements illustrated in FIG. 10 are contained within the stand-alone device of FIG. 9.

Figure 11:
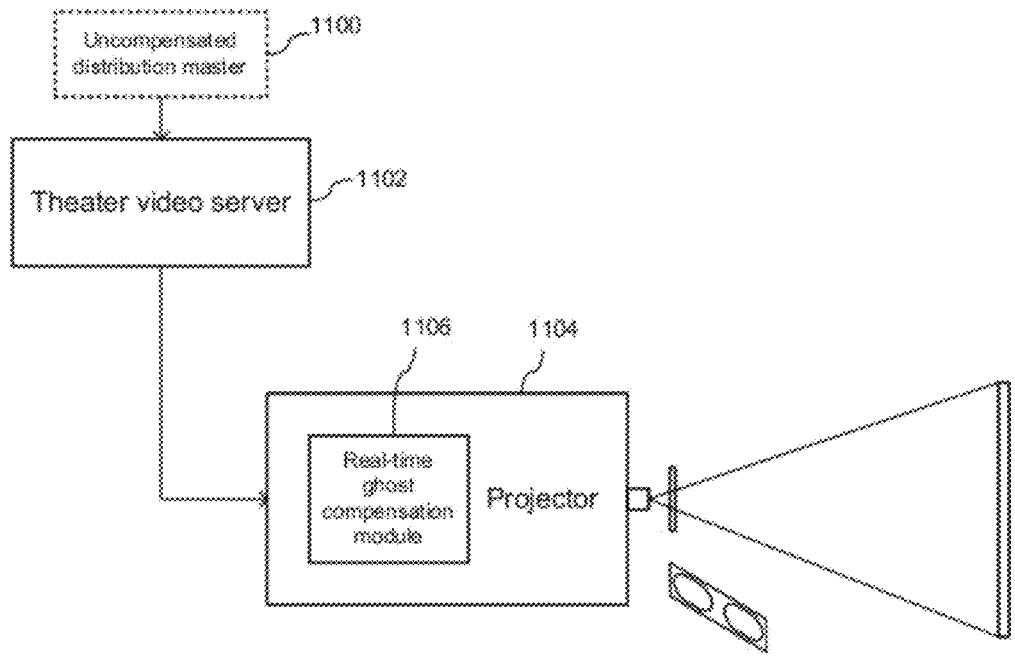
FIG. 11 shows real-time ghost compensation provided in a theater projector.

FIG. 11 illustrates a further alternative embodiment in which an uncompensated distribution copy of a stereoscopic movie 1100 is supplied from a theater video server 1102 to a digital theater projector 1104 that includes a real-time ghost compensation module 1106. The ghosting coefficient(s) applied by the compensation module are measured and calculated for the specific installation to provide optimum performance.

Figure 12:
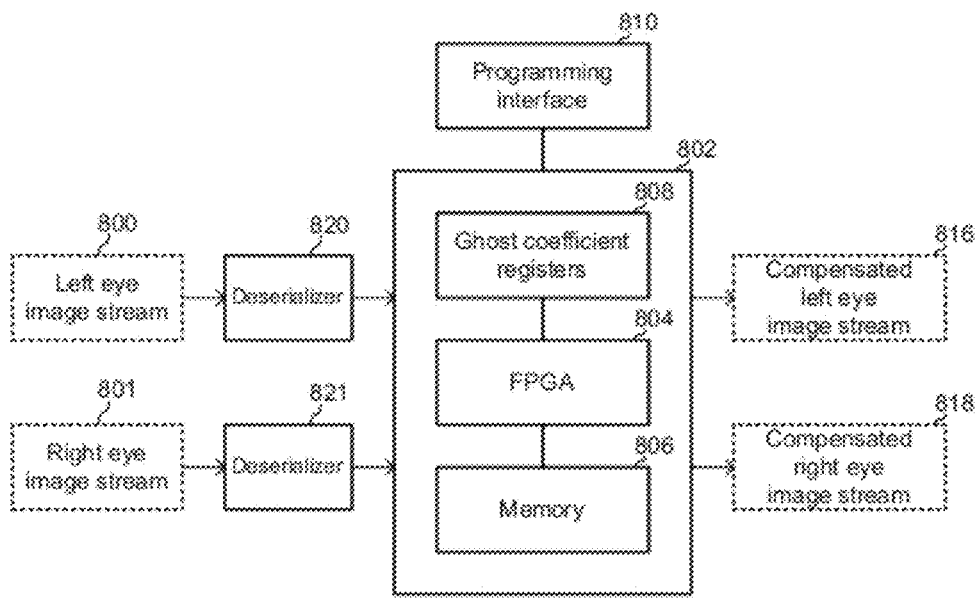
FIG. 12 shows details of the embodiment of FIG. 11.

FIG. 12 shows details of an implementation of the compensation module of the projector embodiment. The elements of the compensation module are similar to those of FIGS. 8 and 10. Although the image processing of the compensation module may be performed by a microprocessor acting under the control of software or firmware, such as the native processing elements of the projector (e.g. the resizing engine), image processing may be performed by a field programmable gate array (FPGA) 804 that is configured to receive image data and ghosting coefficients as inputs and to process the image data according to the Equations presented and in the manner discussed with respect to FIG. 5. Associated with the FPGA 804 is a memory 806 for providing a working memory space, and ghosting coefficient registers 808 for storing the ghosting coefficients to be applied in the compensation processing. A programming interface 810 enables control of the compensation module 802. In a simple implementation, the programming interface may consist of a set of switches manually set to provide a binary representation of the ghosting coefficients to be applied. For example, if one component includes more ghosting than another in the setup, such as a great deal of red ghosting occurs, the programming interface may enable the operator to employ more ghost compensation in the red realm than blue and green realms. Other aspects may be altered via the programming interface, including but not limited to processing data within a certain established time, or other appropriate control features.

The FPGA 804 may be set in a bypass mode in which no compensation processing is performed. However, in more robust implementations, the programming interface may comprise a serial port or a network interface and related circuitry for receiving ghosting coefficients as well as receiving and executing compensation module control commands. The programming interface of the compensation module 802 may communicate through the communications subsystem of the projector, enabling the compensation module to be addressed through a communications port of the projector such as an Ethernet port to receive ghosting coefficients and commands.

The compensation module of the projector embodiment obtains left eye and right eye data from deserializers 820 and 821 of the projector. The projector architecture typically has the capability of accepting serial (HDSDI) or DVI inputs. The linearized compensated images generated by the compensation module may be supplied to the image rendering elements of the projector.

In accordance with another alternative embodiment, the substantial computational capability of a computer graphics output card may perform compensation in real-time on image data sent from a computer to a display device. This embodiment uses the capability of the graphics card to perform the numerical computations of the compensation algorithm, in real-time, operating from content processed or played from or through a processing device such as a personal computer.

Figure 13:
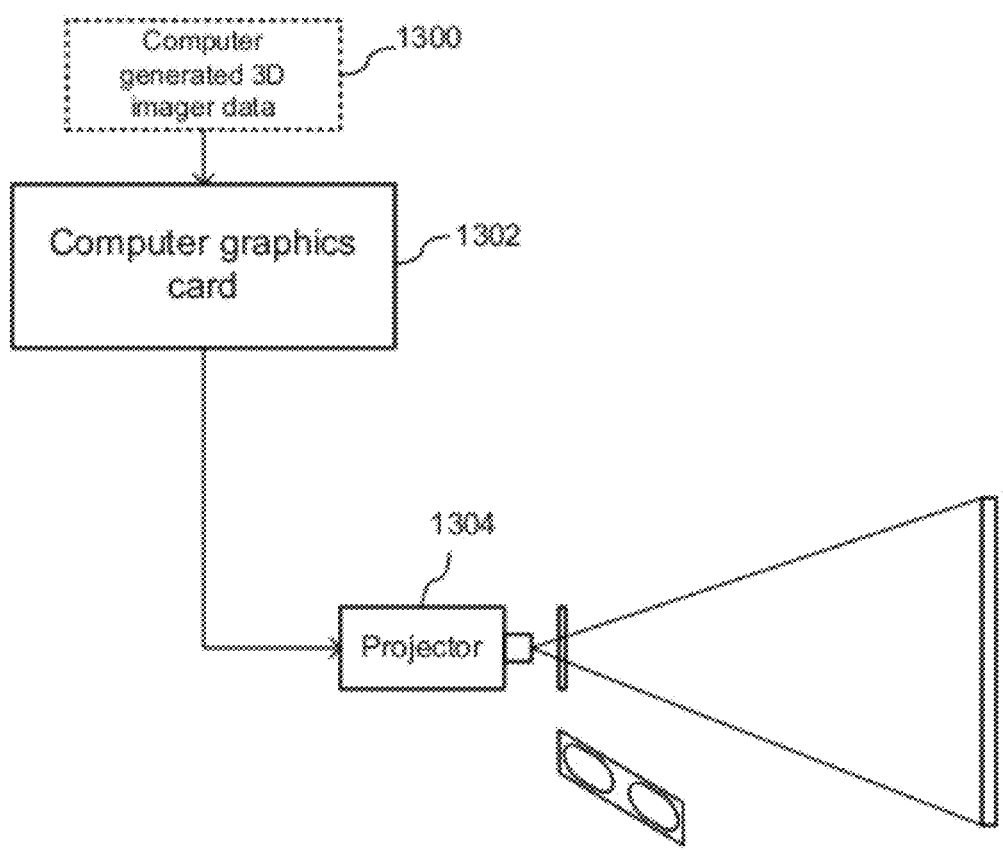
FIG. 13 illustrates where real-time ghost compensation provided using an advanced computer graphics card.

FIG. 13 illustrates an embodiment in which computer generated 3D imagery 1300 such as a movie or a video game is generated in real-time or non-real-time, and the output is displayed using a 3D enabled graphics card 1302 and a display device 1304 such as a projector or a stereoscopic direct view display. The 3D graphics card is programmed to perform ghost compensation on the displayed images in real-time in the manner illustrated in FIG. 5.

Figure 14A:
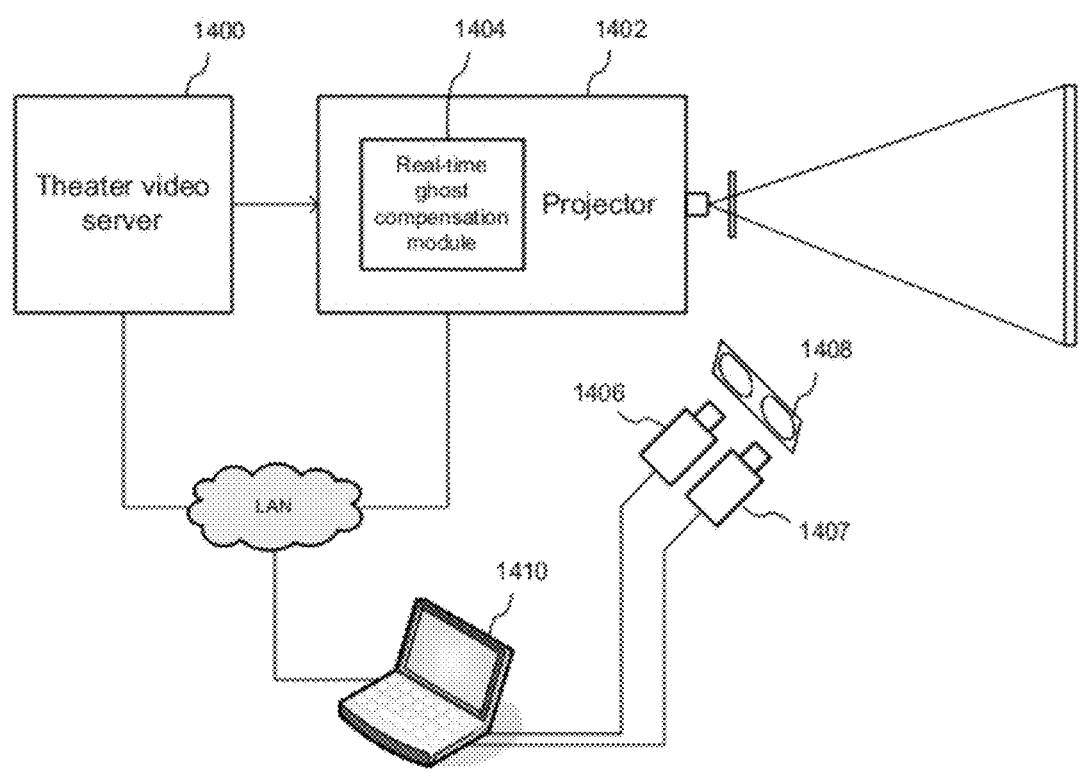
FIGS. 14A and 14B show a system for automating the ghost compensation calibration process at an installation site, and a process flow for the automation process.
Figure 14B:
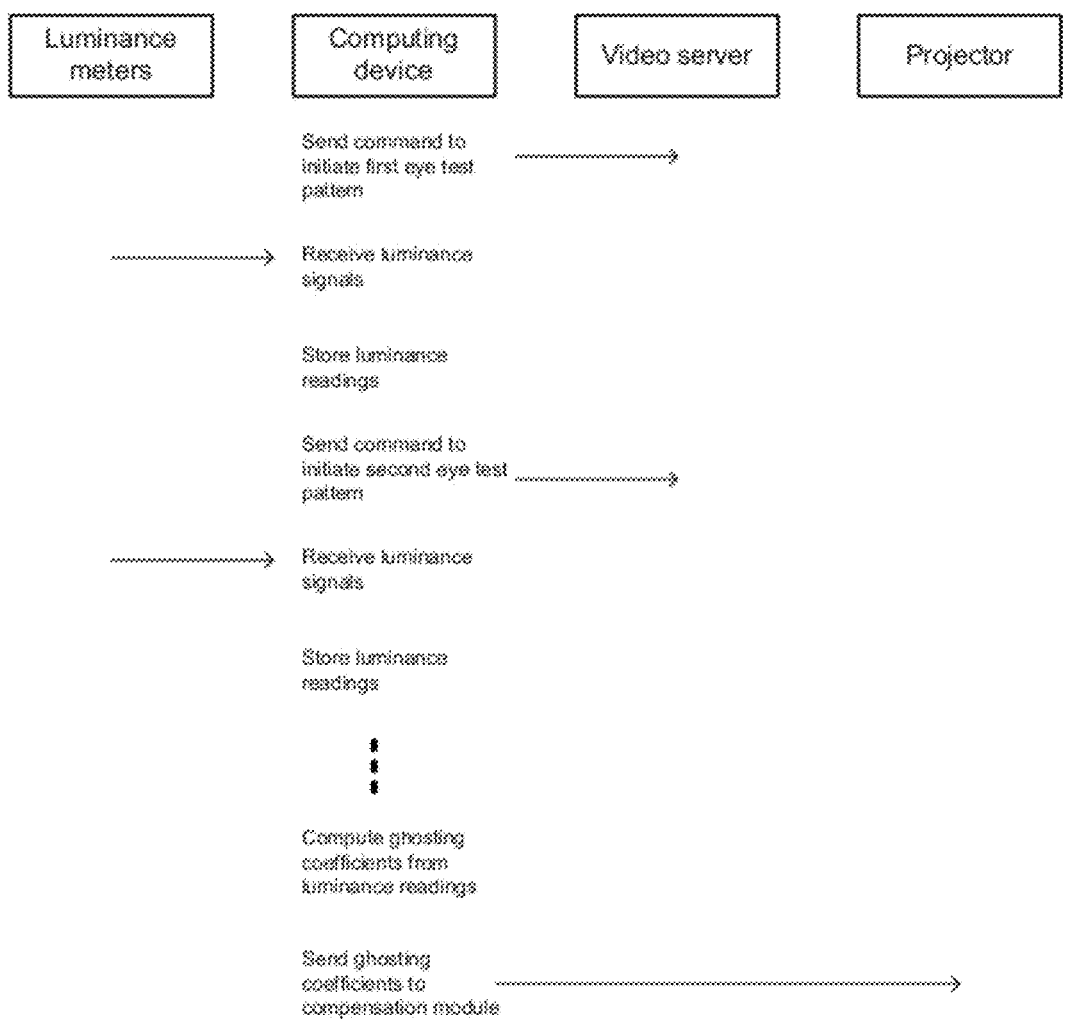

FIGS. 14A and 14B illustrate an embodiment of a system for calibrating the ghosting compensation to be performed at a particular installation. For purposes of illustration, the embodiment is shown in the context of a theater projection system in which ghosting compensation is performed by the projector, however the system may be adapted to operate in conjunction with any of the embodiments described herein.

FIG. 14A shows the elements of the automated calibration system, including a theater video server 1400 and a projector 1402 that includes a ghost compensation module 1404. Luminance meters 1406 and 1407 may be arranged with respect to a set of analyzer glasses 1408 so as to be capable of measuring luminance during projection of a test pattern. In alternative embodiments the luminance meters may be replaced with digital cameras or other similar devices. A computing device 1410 such as a laptop computer receives a signal representing measured luminance from the luminance meter, such as through a serial port. The computing device 1410 is also coupled through a local area network to the video server 1400 and the projector 1402 to enable the computing device to supply data and issue commands to the server 1400 and projector 1402.

The computing device executes a calibration application that automates the test pattern display and analysis and the setting of ghosting coefficients described herein. FIG. 14B illustrates a high level process flow of the calibration application and its interaction with other system devices. Initially the calibration application sends a command to the video server to initiate the first eye test pattern, i.e. either the pattern that provides full luminance to the left eye or the pattern that provides full luminance to the right eye. While it is assumed here that the test pattern image data is resident in the video server, in alternative embodiments the calibration application may also supply the test pattern image data to the video server along with any commands necessary to cause the server to execute the test pattern. Once the test pattern is initiated, luminance signals are received from the luminance meters. From these signals, the system takes and stores luminance readings. The calibration application then issues a command to the video server to initiate the second eye test pattern, i.e. the test pattern for the eye opposite to that of the first test pattern. Luminance signals are again received from the luminance meters and readings are taken and stored. The process of initiating test patterns and taking readings is repeated as necessary to obtain readings for all primary colors of the projector or all pertinent parameters employed in the ghost compensation, such as luminance/chrominance, etc.

After all readings are obtained, the calibration application computes the ghosting coefficients of the left eye and right eye channels in the manner described above. The calibration application then sends the ghosting coefficients to the compensation module in the projector along with any commands necessary to store the ghosting coefficients and enable compensation processing using those coefficients. Ghosting coefficients may take any of a variety of forms appropriate for the specific implementation, such as in an array or arrays or via a set of data values in a stream or listing. For example, if a region, including a pixel, has a red GC of 0.3, the value of 0.3 and the coordinate of that pixel may be transmitted to the compensation module, and similar red coefficients for all regions or pixels in the image are transmitted, typically indexed by region or pixel numbers or locations. Similar GC values may be transmitted for green and blue in the manner discussed.

Figure 15A:
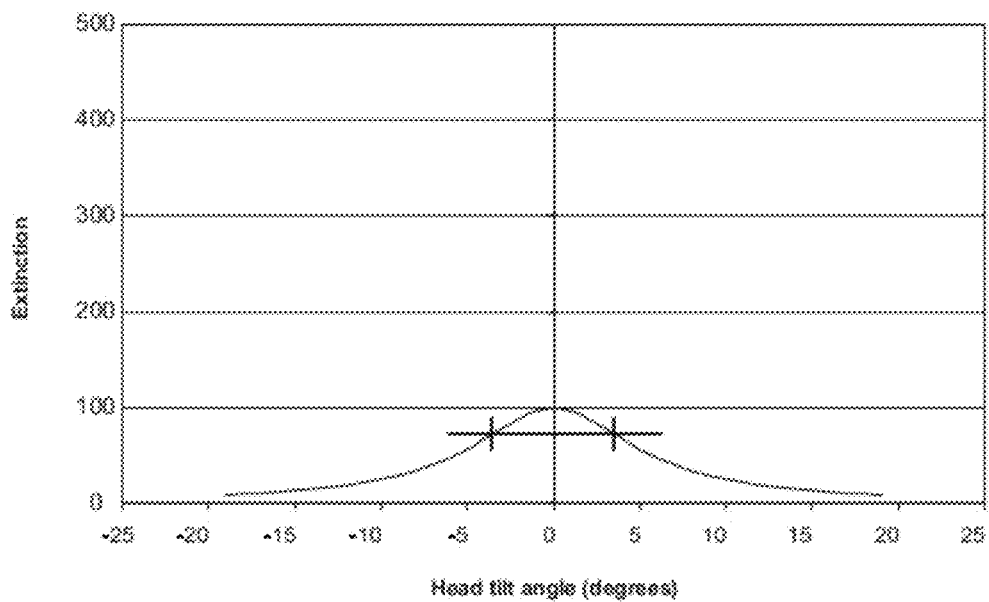
FIGS. 15A and 15B show the improvement in the head tipping range provided by ghost compensation as described herein.
Figure 15B:
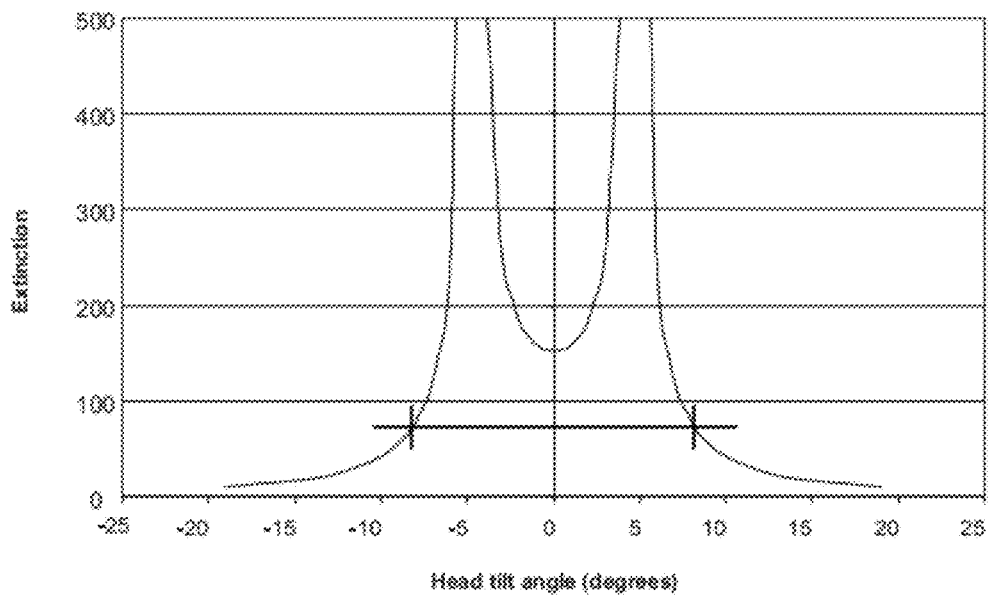

FIGS. 15A and 15B illustrate an improvement in head tilting range that may be achieved in a system using linearly polarized images. Uncompensated linear polarized systems allow only a small head tilt before unacceptable ghosting occurs. For example, in a system where the linear polarizers have extinction of greater than 1000:1 and the screen maintains polarization to 99%, just 3 degrees of head tilt can induce ghosting of 75:1, and the ghost component becomes objectionable. This level of head tilt is difficult to maintain for many viewers. Using ghost compensation, it is possible to extend this range of tilting that results in acceptable viewing to approximately 8 degrees.

FIG. 15A shows the extinction versus head tilt for an uncompensated system. The curve shows that an extinction ratio of 75:1 is achievable only at tilt angles of less than 3 degrees in either direction. FIG. 15B shows the performance when moderate ghost compensation is applied. The curve shows the effect of overcompensating, resulting in good extinction at zero degrees, and maintenance of at least a 75:1 extinction ratio within a head tilt range of 8 degrees in either direction. Note that when ghosting is overcompensated, negative ghosts are produced (dark ghosts). The absolute value of the ghost has been plotted for clarity of explanation.

Similarly, ghost compensation in accordance with embodiments disclosed provides enhanced performance for circular polarization applications, enabling dynamic ranges comparable to those of linear polarization systems to be achieved.

Figure 16:
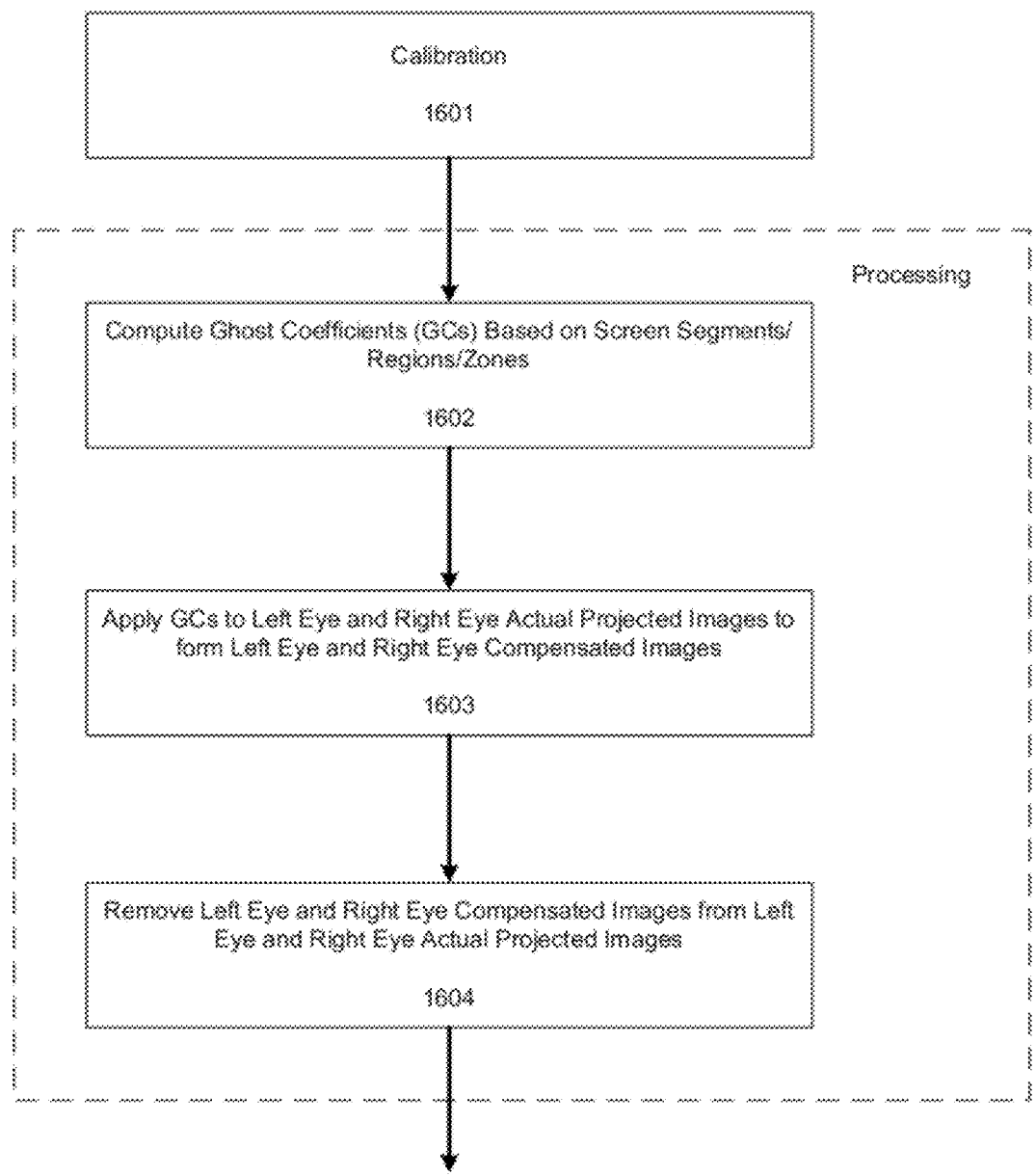
FIG. 16 is a flowchart overview of operation of the present design.

FIG. 16 illustrates general operation of the current design. In FIG. 16, point 1601 represents calibration of the system, wherein at a particular site implementation the methodology of measuring the ghosting for the setup is employed as discussed above, namely measuring the ghosting in the specific environment, modeling the environment, or employing other ghosting measurement techniques. The result of the calibration 1601 may be termed a ghosting profile or expected ghosting profile. At point 1602, the system begins processing by computing at least one ghost coefficient or ghost artifact coefficient based on the screen segments, regions, or zones, which may be based on the results from point 1601 calibration. Each ghost artifact coefficient represents ghost artifacts leaking from the left eye image into the right eye image and from the left eye image into the right eye image. Point 1603 represents applying at least one ghost artifact coefficient for a left eye projected image to a right eye projected image to form a compensated right eye projected image, and applying at least one ghost artifact coefficient for the right eye projected image to the left eye projected image to form a compensated left eye projected image. Point 1604 signifies removing the compensated right eye projected image from the right eye projected image, and removing the compensated left eye projected image from the left eye projected image. The result is transmitted to the screen and represents a projected image having ghosting or ghost artifacts removed therefrom.

In a display system, factors that create ghosting are generally different in different parts of the display. Such differences are generally the result of differences in the angle at which light passes through the optical elements and the differences in angle of reflection off the screen. Screen composition may contribute to the artifacts or ghosts perceived. In such a construction, different ghost factors are required to optimize the ghost image depending on ghost position on the screen. Typically more ghosting exists at the edges and corners of the image than in the center of the screen.

Figure 17A:
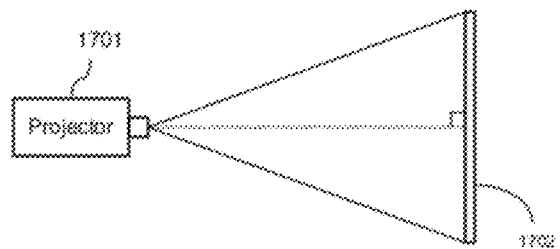
FIGS. 17A-17F illustrate a segmented approach to ghost or ghost artifact compensation.
Figure 17B:
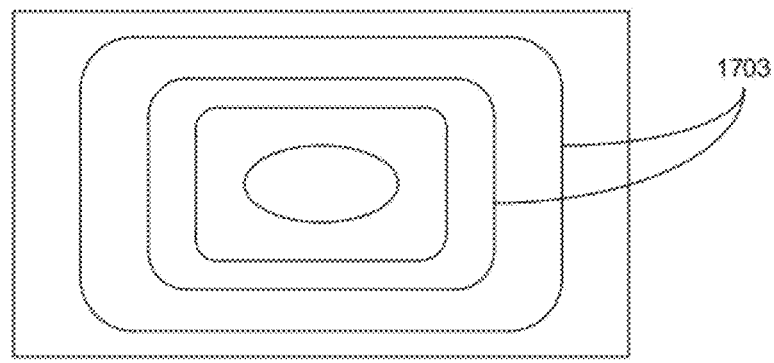
Figure 17C:
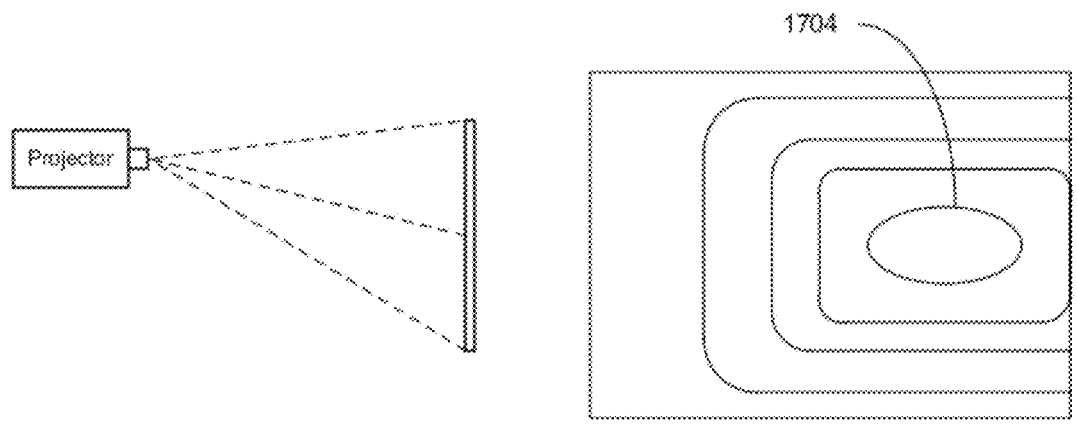

FIGS. 17A-17F illustrate the general approach to segmented ghost correaction, wherein the screen area or a hypothetical/theoretical screen area is divided into a plurality of segments, regions, or zones. FIG. 17A shows a typical projection layout in a movie theatre environment with the projector 1701 perpendicular to the screen 1702. From a central viewing point, i.e. a seat located at the centerline of the theatre, the ghosting will be roughly symmetrical about the center point on the screen. FIG. 17B shows a screen with a typical distribution of the intensity of the ghost image. These are shown in the figure as contour lines 1703 representing edges of regions or zones having equal ghost intensity. If the projector is not projecting perpendicular to the center of the screen, but off axis, the distribution of ghosting will shift on the screen, as shown in FIG. 17C, with the contour lines 1704 shifted off center.

The optimum correaction for the theatre is created by characterizing the ghosting factor across the area of the screen, generally by sampling or modeling the amount of ghosting in each part of the screen and creating a segmented correaction map. For example, if Red/Green/Blue components are treated separately, blue ghosting may be significant at an edge or all edges of the screen. The blue GC at an outer region or zone, toward the edge of the image, may be 0.4, while at the center of the screen blue ghosting may not be as significant and may therefore have a smaller GC, such as 0.15. Each zone may have different GCs or may employ different ghosting properties depending on the particular environment.

Figure 17D:
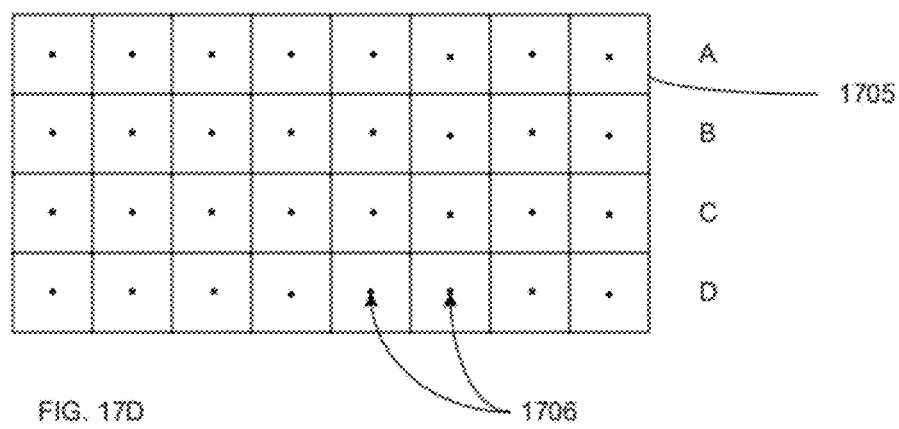
Figure 17E:
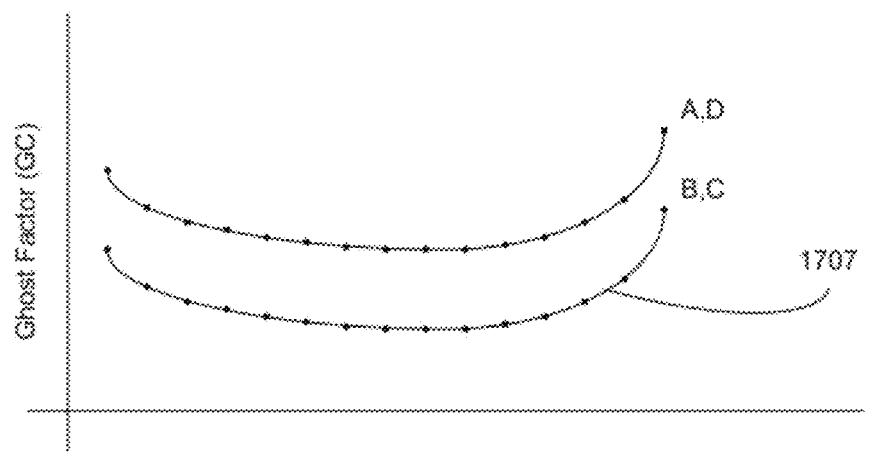

FIG. 17D illustrates how a screen may be broken into a grid 1705 for characterizing the ghosting, with sample points 1706 in the grid. This grid may have a small number of sample points, or a very large number of points as might be captured by a digital camera or modeled by a sophisticated computer model. The ghost factor map or GC map may be a set of constants or may be reduced to a mathematical equation or family of equations that characterize the ghost factor (intensity of the ghost) against each segment, or the calibration data may be stored as a table. FIG. 17E illustrates a sample plot of the ghost correaction factors generated by a sampling procedure such as that illustrated in FIG. 17D, where sample points 1707 make up the graph. The appropriate factor is applied to the corresponding area of the image. As shown in FIGS. 17D and 17E, the points may be characterized by the row in which the pixels reside, such as Rows A and C of FIG. 17D exhibiting the same profile in FIG. 17E. Other profiles may be realized, such as groups of rows, columns, zones, or regions having similar or identical profiles, or all profiles may differ.

Figure 17F:

The foregoing outlines a general case where the ghost factor is potentially different for every point on the screen. From a more practical point of view, the correaction may be applied in the horizontal direction only such as is illustrated in FIG. 17F. FIG. 17F illustrates the screen broken into vertical regions, zones, or strips 1708 where the same factor is applied on each strip. The plot 1711 shows an example of how the ghost factor might vary across each vertical strip. The end result is a cleaner picture viewed in the specific environment, with less ghosting apparent to viewers in the theatre.

We have described a means for improving the projection of stereoscopic motion picture images, for a variety of uses but primarily for the theatrical motion picture industry. The application of ghost compensation technology allows for clearer, sharper, deeper stereoscopic movies with better off-screen effects. Preferred embodiments use real-time pre-compensation based on ghosting characteristics measured at the installation site so that the compensation is tailored to the characteristics of the individual screening room or theatre. An advantage of local ghosting characterization and processing is that only one type of print needs to be distributed for all theatres. Thus this print may be used in any theater for either planar exhibition or stereoscopic exhibition. Thus, by the real-time addition of the ghost pre-compensation at the projector or server, the distributors and exhibitors enjoy the economic and logistical advantages of using a single inventory of prints for all applications.

The circuits, devices, processes and features described herein are not exclusive of other circuits, devices, processes and features, and variations and additions may be implemented in accordance with the particular objectives to be achieved. For example, devices and processes as described herein may be integrated or interoperable with other devices and processes not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A system of projecting stereoscopic images to a viewer, comprising:
   a projection arrangement configured to project polarized light energy toward a screen; and
   a set of polarized eyewear wearable by the viewer and configured to receive the polarized light energy projected to the screen and transmit a right perspective view to a right eye of the viewer and a left perspective view to a left eye of the viewer;

wherein the projection arrangement employs a noise reduction technique to reduce crosstalk in polarized light energy images, the noise reduction technique comprising overcompensating ghosting based on a tilted alignment.

2. The system of claim 1, wherein the viewer perceiving a quality stereoscopic image projected without the noise reduction technique and having a set of optical conditions at a head tipping angle can substantially perceive a similar quality stereoscopic image generated with the noise reduction technique and having the set of optical conditions at in excess of two times the head tipping angle.

3. The system of claim 1, wherein the noise reduction technique comprises reducing visual ghost artifacts in plano-stereoscopic image transmissions.

4. The system of claim 3, wherein reducing visual ghost artifacts in plano-stereoscopic image transmissions comprises:
dividing a hypothetical screen representation into a plurality of regions corresponding to regions on a projection screen;
computing at least one ghost artifact coefficient depending upon expected ghosting within an associated region established by said dividing;
computing a ghosting component of an image of a first eye based on the at least one ghost artifact coefficient; and
removing the ghosting component of the image for the first eye from an image for a second eye to form a compensated image for the second eye.

5. The system of claim 4, wherein reducing visual ghost artifacts in plano-stereoscopic image transmissions further comprises:
computing a ghosting component of an image for the second eye based on the at least one ghost artifact coefficient; and
removing the ghosting component of the image for the second eye from the image for the first eye to form a compensated image for the first eye.

6. The system of claim 4, wherein said computing comprises computing ghost artifacts for a multiple of attributes associated with the left eye image and the right eye image.

7. The system of claim 6, wherein the multiple of attributes comprises a red attribute, a green attribute, and a blue attribute.

8. A method for projecting stereoscopic images to a viewer, comprising:
projecting polarized light energy toward a screen; and
providing the viewer with a set of polarized eyewear configured to receive the polarized light energy projected to the screen and transmit a right perspective view to a right eye of the viewer and a left perspective view to a left eye of the viewer;
wherein the projecting comprises performing a noise reduction technique to reduce crosstalk in polarized light energy images, the noise reduction technique comprising overcompensating ghosting based on a tilted alignment.

9. The method of claim 8, wherein the viewer perceiving a quality stereoscopic image projected without the noise reduction technique and having a set of optical conditions at a head tipping angle can substantially perceive a similar quality stereoscopic image generated with the noise reduction technique and having the set of optical conditions at in excess of two times the head tipping angle.

10. The method of claim 8, wherein the noise reduction technique comprises reducing visual ghost artifacts in plano-stereoscopic image transmissions.

11. The method of claim 10, wherein reducing visual ghost artifacts in plano-stereoscopic image transmissions comprises:
dividing a hypothetical screen representation into a plurality of regions corresponding to regions on a projection screen;
computing at least one ghost artifact coefficient depending upon expected ghosting within an associated region established by said dividing, each ghost artifact coefficient representing ghost artifacts leaking from a left eye image into a right eye image and from the right eye image into the left eye image;
computing a ghosting component of an image for a first eye based on the at least one ghost artifact coefficient; and
removing the ghosting component of the image for the first eye from an image for a second eye to form a compensated image for the second eye.

12. The method of claim 11, wherein reducing visual ghost artifacts in plano-stereoscopic image transmissions further comprises:
computing a ghosting component of an image for the second eye based on the at least one ghost artifact coefficient; and
removing the ghosting component of the image for the second eye from the image for the first eye to form a compensated image for the first eye.

13. The method of claim 11, wherein said computing comprises computing ghost artifacts for a multiple of attributes associated with the left eye image and the right eye image.

14. The method of claim 13, wherein the multiple of attributes comprises a red attribute, a green attribute, and a blue attribute.

15. A method of delivering stereoscopic images to a viewer wearing polarized eyewear, comprising:
providing a polarized right perspective view and a polarized left perspective view; and
performing a noise reduction technique to at least one of polarized right perspective view and the polarized left perspective view to compensate crosstalk in polarized light energy images, the noise reduction technique comprising overcompensating ghosting based on a tilted alignment.

16. The method of claim 15, wherein the viewer perceiving a quality stereoscopic image provided without the noise reduction technique and having a set of optical conditions at a head tipping angle can substantially perceive a similar quality stereoscopic image generated with the noise reduction technique and having the set of optical conditions at in excess of two times the head tipping angle.

17. The method of claim 15, wherein the compensating comprises reducing visual ghost artifacts in plano-stereoscopic image transmissions.

18. The method of claim 17, wherein reducing visual ghost artifacts in plano-stereoscopic image transmissions comprises:
dividing a hypothetical screen representation into a plurality of regions corresponding to regions on a projection screen;
computing at least one ghost artifact coefficient depending upon expected ghosting within an associated region established by said dividing, each ghost artifact coefficient representing ghost artifacts leaking from a left eye image into a right eye image and from the right eye image into the left eye image;
applying at least one ghost artifact coefficient for a left eye projected image to a right eye projected image to form a compensated right eye projected image; and removing the compensated right eye projected image from the right eye projected image.

19. A device for providing stereoscopic images, comprising:
    a processor configured to provide polarized light energy, the polarized light energy comprising a right perspective view and a left perspective view; and
    wherein the processor is operable to compensate crosstalk in polarized light energy images using a noise reduction technique, the noise reduction technique comprising overcompensating ghosting based on a tilted alignment.

20. The device of claim 19, wherein the polarized light energy is circularly polarized.

21. The device of claim 19, wherein the polarized light energy is linearly polarized.

22. The device of claim 19, wherein the noise reduction technique comprises:
    dividing a hypothetical screen representation into a plurality of regions corresponding to regions on a projection screen;
    computing at least one ghost artifact coefficient depending upon expected ghosting within an associated region established by said dividing;
    computing a ghosting component of an image for a first eye based on the at least one ghost artifact coefficient; and
    removing the ghosting component of the image for the first eye from an image for a second eye to form a compensated image for the second eye.

23. The device of claim 22, wherein the noise reduction technique further comprises:
    computing a ghosting component of an image for the second eye based on the at least one ghost artifact coefficient; and
    removing the ghosting component of the image for the second eye from the image for the first eye to form a compensated image for the first eye.

24. The device of claim 23, wherein computing at lease one ghost artifact coefficient comprises computing a plurality of ghost artifact coefficients, wherein computing the ghost component of the image for the first eye comprises using a first ghost artifact coefficient, and wherein computing the ghost component of the image for the second eye comprises using a second ghost artifact coefficient.

25. The device of claim 24, wherein the first and second artifact coefficients are different.

26. The system of claim 1, wherein the polarized light energy is circularly polarized.

27. The system of claim 1, wherein the polarized light energy is linearly polarized.

28. The system of claim 8, wherein the polarized light energy is circularly polarized.

29. The system of claim 8, wherein the polarized light energy is linearly polarized.

30. The system of claim 15, wherein the polarized light energy is circularly polarized.

31. The system of claim 15, wherein the polarized light energy is linearly polarized.

32. A device for providing stereoscopic images, comprising:
    a processor configured to provide polarized light energy, the polarized light energy comprising a right perspective view and a left perspective view; and
    wherein the processor is operable to compensate crosstalk in polarized light energy images using a noise reduction technique, the noise reduction technique comprising overcompensating ghosting based on a tilted alignment; and
    wherein a perception of a first stereoscopic image provided without the noise reduction technique and having a set of optical conditions at a first head tipping angle can be substantially similar to a perception of a second stereoscopic image generated with the noise reduction technique and having the set of optical conditions at a second head tipping angle greater than the first head tipping angle.

* * * * *